Sept. 15, 1964 A. R. MAXEY 3,149,207

TAPE TRANSPORT

Filed Nov. 29, 1960 4 Sheets-Sheet 1

ALEXANDER R. MAXEY
INVENTOR.

BY Robert G. Clay
ATTORNEY

Sept. 15, 1964 A. R. MAXEY 3,149,207

TAPE TRANSPORT

Filed Nov. 29, 1960 4 Sheets-Sheet 2

ALEXANDER R. MAXEY
INVENTOR.

BY Robert S. Clay
ATTORNEY

ALEXANDER R. MAXEY
INVENTOR.

BY Robert G. Clay
ATTORNEY

Sept. 15, 1964 A. R. MAXEY 3,149,207

TAPE TRANSPORT

Filed Nov. 29, 1960 4 Sheets-Sheet 4

ALEXANDER R. MAXEY
INVENTOR.

BY Robert S. Clay
ATTORNEY

United States Patent Office 3,149,207

Patented Sept. 15, 1964

3,149,207

TAPE TRANSPORT

Alexander R. Maxey, Redwood City, Calif., assignor to Ampex Corporation, Redwood City, Calif., a corporation of California Filed Nov. 29, 1960, Ser. No. 72,352
14 Claims. (Cl. 179—100.2)

This invention relates to tape transports and particularly to transports employing an endless tape system.

In magnetic tape transports, particularly as employed with computers and data processing systems, it is desirable to produce extremely fast movement of the tape past the recording and reproduce heads so as to achieve a rate of information flow that is in keeping with the rate at which the rest of the system can supply and absorb information. High speeds are also desirable during the preliminary process of searching the tape for particular blocks of information or for particular blank zones in which such blocks are to be recorded. The tapes commonly used for such purposes may be a mile long or longer. In scanning such a length in the period of a few seconds, which is all the time that is desirable, some extreme mechanical stresses are imposed on either the apparatus or the tape. With the tape coiled on a revolving reel or reels as is customary in the art, the centrifugal forces alone may be enough to break the tape or to stretch the tape longitudinally in such a way as to decrease the effective (longitudinal) density of the information as it moves past the heads. All changes in direction of the tape at high speed, and the sudden starts and stops of the tape that are usually required, produce similar distortions of the tape. While in audio recorders such variations are sometimes tolerated, a computer is completely thrown off thereby and the information is rendered useless.

It will be recognized that the forces, centrifugal or other, that act on the tape are acceleration and deceleration forces. Consequently, the amount of stress and the strain produced thereby is a function of the mass of the tape that is actually being accelerated at a given instant. In conventional reel systems this mass is of course the mass of the entire coiled portion of the tape.

For convenience with computer and processing systems, it is also desirable to use a tape formed as an endless loop.

Accordingly, it is an object of the present invention to provide a transport apparatus for moving a tape at very high speed with minimal distortion of the tape, and with minimal tape friction.

It is another object of the invention to provide a tape transport system for extremely rapid searching, recording and reproducing; the system being certain and accurate in operation and requiring minimum power for starting, moving and stopping the tape.

It is still another object of the invention to provide an apparatus for storing the major portion of a tape in a convenient small volume and in a dynamic condition producing substantially no strain in the tape, and for accelerating a minimal portion of the mass of the tape to very high speed for recording or reproducing information.

It is a further object of the invention to provide a transport as above described and adapted to process tape in an endless loop or system of endless loops.

It is a still further object of the invention to provide a tape transport suitable for making television recordings longitudinally of the tape.

In accordance with the present invention, an endless loop of tape is coiled in nearly stationary condition on a frame, with the tape being drawn off the coil from the interior thereof and the drawn off portions being accelerated over a very short distance to an extremely high speed. The accelerated portions are then transported by a capstan past recording or reproducing heads and thence to the exterior of the coil for deceleration and return to the coil as the outer layer thereof. Other structures in accordance with the invention are adapted to process more than one loop of tape at a time, and to record or reproduce at more than one point on the tape at a time.

The invention will be described in greater detail in conjunction with the accompanying drawings in which.

Figure 1:
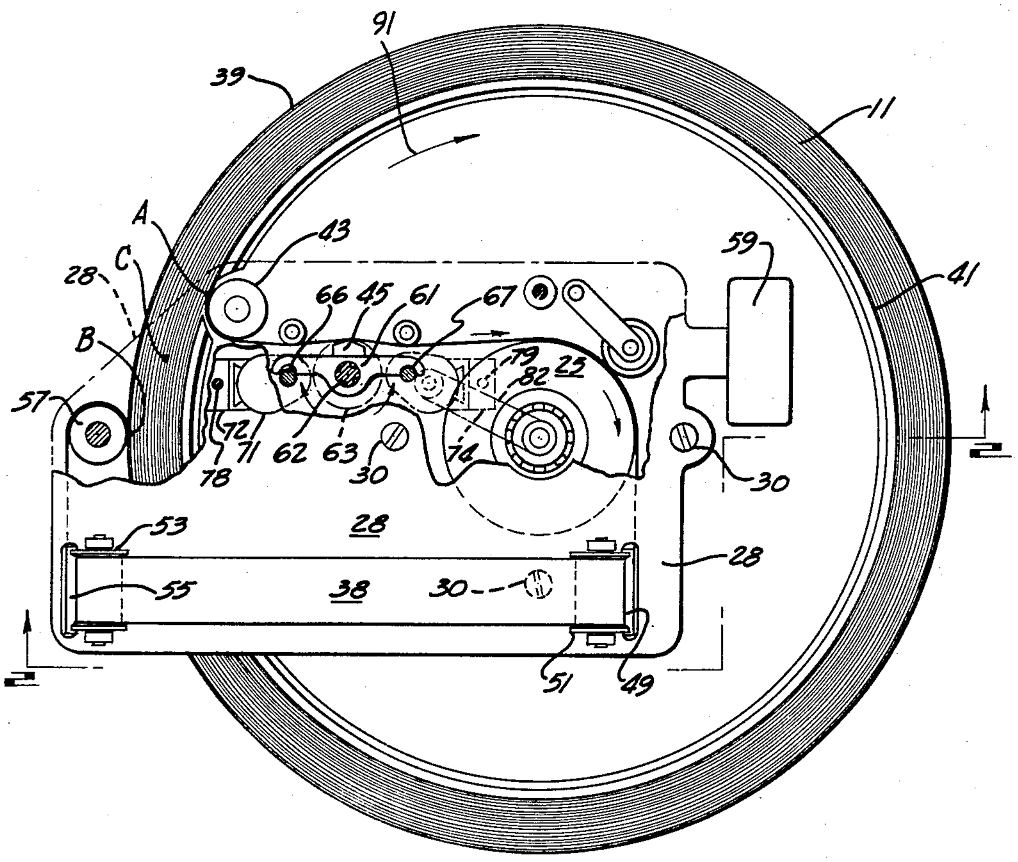
FIGURE 1 is a plan view of one embodiment of the invention.
Figure 2:
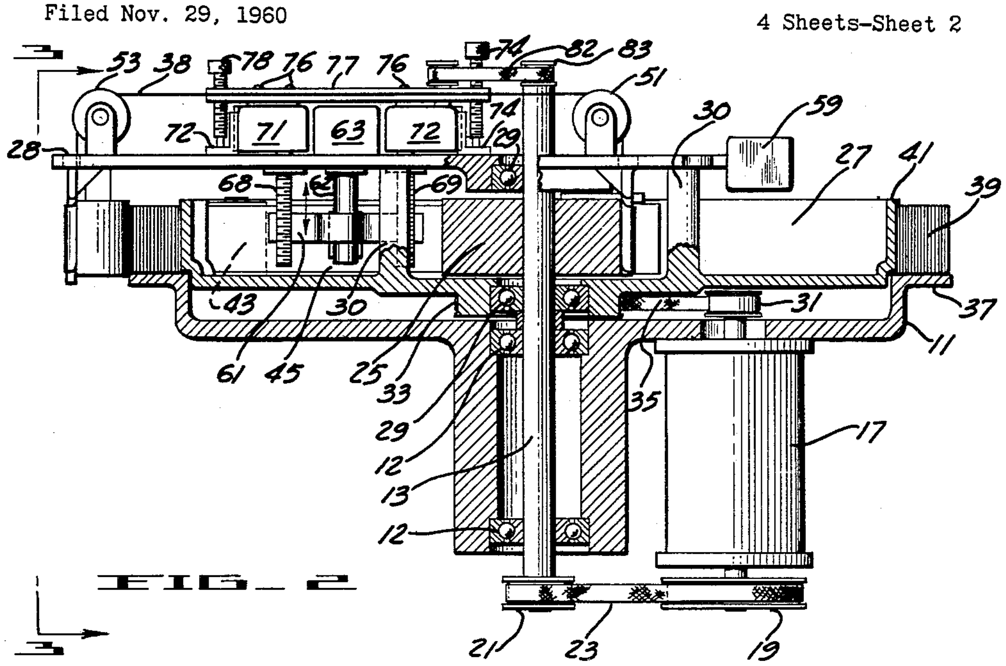
FIGURE 2 is a cross-sectional view taken along the lines 2—2 of FIGURE 1.
Figure 3:
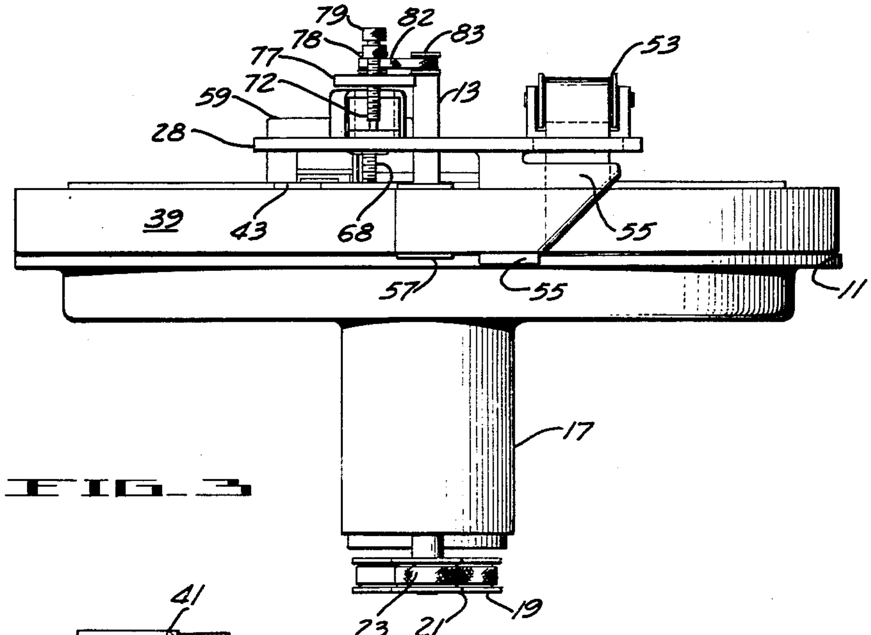
FIGURE 3 is an elevation view taken along the lines 3—3 of FIGURE 2.

In FIGURES 1, 2 and 3 one embodiment of the invention comprises a stationary tape pack platform 11 disposed about a bearing 12. A shaft 13 is supported by the bearing for free rotation with respect to the platform 11. The shaft 13 is driven by a motor 17 through a drive means that includes pulleys 19 and 21 and a drive belt 23. A capstan 25 is suitably affixed to the upper end of the shaft 13.

A support assembly 27, including an upper plate 28 supported on studs 30, rotates about the shaft 13 on bearings 29. The support assembly is also driven by the motor 17. The drive means includes a pulley 31, hub 33 and drive belt 35. A shoulder 37 is formed on the outer edge of the tape pack platform 11 whereon tape 38 in a pack 39 is stacked. A tape support rim 41 is formed on the outer edge of the support assembly 27 and disposed adjacent to tape pack 39 to prevent inward radial movement of the tape pack.

Tape from the inside of the tape pack 39 passes about an entry idler 43, past a transducer 45, and between the capstan 25 and a pinch roller 47. The return path of the tape from the capstan 25 includes a diagonal guide post 49, rollers 51 and 53, another diagonal guide post 55 and a tape return idler 57. All of the components in the tape path with the exception of the capstan 25, are mounted on the support assembly 27 for rotation therewith about the shaft 13. Since the mass of the support assembly is eccentric, a counterbalance 59 is attached thereto to minimize vibrating effect upon high speed rotation of the assembly.

It will be understood that the transducer 45 may be constructed as a plurality of reading and recording magnetic heads arranged in a stack transverse to the tape, so as to be able to record and read on one or more parallel magnetic tracks at once.

In operation, the tape pack 39 is stored on the shoulder 37 against the tape support rim 41. The absolute speed of the moving tape is determined by the speed of the capstan 25. Since the outer and inner edges of the tape pack 39 have different diameters, the tape within the pack must be free to rotate with respect to its various layers, as well as with respect to the shoulder 37 and rim 41. In high speed operations, respective rotation is facilitated by a film of air between the layers of the tape. This air film may be supplied artificially during start up of the machine, as by means of blowers (not shown); but during operation at high speeds, the air films form automatically.

The rotational speeds of the support assembly 27 with respect to the stationary shoulder 37 and of the capstan 25 with respect to the support assembly 27 are carefully chosen so that a suitable tension is maintained in the tape 38 as it proceeds from the idler 43 to the capstan and from the capstan to the idler 57. Broadly speaking, this effect is obtained by giving the capstan 25 a peripheral velocity with respect to the support assembly 27 that is intermediate the peripheral velocities (with respect to the shoulder 37) of portions of the support assembly 27 that lie at radii corresponding with the inner and outer turns of the tape pack 39 (for example, the radii "A" and "B" shown in FIGURE 1). This arrangement will be better understood with respect to the following example:

Let the support assembly 27 at the rim 41 have a diameter of 23 inches, and let it be rotating at ten revolutions per second clockwise as shown in FIGURE 1, so that at radius "A" the rim 41 has a peripheral linear velocity of 720 inches per second with respect to the stationary shoulder 37. Let the diameter of the outer coil, at radius "B" corresponding with the outer diameter of the tape pack 39, be 25.6 inches so that the peripheral velocity of the support assembly at radius "B" is roughly 850 inches per second. And let the peripheral velocity of the capstan 25 with respect to the support assembly 27 be 750 inches per second, so that the linear velocity of the tape 38 passing the transducer 45 is also 750 inches per second. It follows that the tape at any portion of the system is moving at the nominal linear speed of 750 inches per second with respect to the support assembly 27, as established by the capstan. One of the points at which the tape has such a linear velocity relative to the support assembly is at radius "C" on the shoulder 37, at which radius the stationary shoulder 37 itself has a peripheral linear velocity with respect to the rotating support assembly 27 of 750 inches per second. It will be seen that the following relative velocities exist in the system:

Velocity of support assembly 27 relative to shoulder 37 at radius "A"=720 i.p.s. CW.

Velocity of tape 38 relative to support assembly 27 at radius "A"=750 i.p.s. CCW.

Velocity of tape 38 relative to shoulder 37 at radius "A"=30 i.p.s. CCW.

Velocity of support assembly 27 relative to shoulder 37 at radius "B"=850 i.p.s. CW.

Velocity of tape 38 relative to support assembly 27 at radius "B"=750 i.p.s. CCW.

Velocity of tape 38 relative to shoulder 37 at radius "B"=100 i.p.s. CW.

Velocity of support assembly 27 relative to shoulder 37 at radius "C"=750 i.p.s. CW.

Velocity of tape 38 relative to support assembly 27 at radius "C"=750 i.p.s. CCW.

Velocity of tape 38 relative to shoulder 37 at radius "C"=0 i.p.s.

It will be seen from the above that at radius "C" the tape has substantially zero velocity in the direction of its length with respect to the shoulder 37 (although of course it is inching laterally slowly inward toward the center of the apparatus); and that the tape picks up counter-clockwise longitudinal linear velocity gradually as it moves closer to the center of the apparatus until at radius "A" it has a linear velocity of 30 inches per second counter-clockwise relative to the shoulder 37. Likewise at radius "B" the tape has a longitudinal velocity of 100 inches per second clockwise with respect to the shoulder 37 and gradually loses this velocity as it approaches radius "C," where it stops and begins to move longitudinally in the other direction (counter-clockwise). What happens is that the tape is dragged counter-clockwise off the inside of the pack by the capstan against the natural inertia and frictional forces which tend to hold the tape in place on the shoulder 37, and at the outside of the pack at radius "B" the tape is replaced while at the same time being dragged clockwise around the pack against the same friction which tends to hold the outer turns of the pack in a fixed position on the shoulder 37. In both instances the frictional forces operating between the tape and the shoulder 37 are pulling away from the capstan, and the tape between radius "A" and and the capstan and between the capstan and radius "B" is kept perpetually taut throughout its travel. Any "slack" in the tape tends to accumulate in the tape pack itself and the operating tension on the tape is kept constant.

As an important feature of the invention, the apparatus is arranged so that the mass of tape that is under high acceleration at any instant is very small. As described above, the tape in the outer coil 39 moves at comparatively low velocity radially inward from the outer circumference as the inner portions are drawn off to the center, and there is some longitudinal motion of the coiled tape as it moves inward and as the coil-turns grow ever smaller in diameter, but the movement and the forces existing in the coil 39 are too small to effect longitudinal distortion of the tape. Not until the tape is pulled off the inner periphery of the coil and around the idler 43 does any substantial acceleration occur. As the segment of tape rotates the quarter-turn around idler 43, it undergoes acceleration from very low velocity to the full operational velocity desired, which may be as high as 5000 inches per second. When the tape leaves idler 43, it is travelling at full speed and continues at this speed past the transducer 45, the capstan 25, and the guide posts and idlers 49, 51, 53 and 55 to the idler 57. In passing around the idler 57, the tape is decelerated from its operational speed to very low velocity again. Thus, it is seen that the only portion of tape that is under great acceleration is the quarter-turn of tape in contact with idler 43. But the mass of tape in this portion is very small and the longitudinal stretching forces produced are not great enough to produce any serious distortion. Acceleration of the tape as it changes direction around the capstan, idlers and guide posts likewise produces no distortions of serious proportions.

As another important feature of the invention, the transducer 45 is mounted for controlled transverse movement with respect to the tape 38 so that information may be recorded on or read from a track that is in the form of a helix having an axis transverse to the length of the tape. In this arrangement the transducer 45 is mounted at the middle portion of a cross-arm 61 (FIGURE 1) which is mounted for vertical motion on a splined shaft 62 (FIGURE 2) but is keyed thereto so as to pivot with the splined shaft 62. The shaft 62 extends downwardly from a solenoid 63 which is mounted on the upper plate 28. At the ends of cross-arm 61 are respectively formed two vertical semi-cylindrical grooves 66 and 67, which are helically threaded to engage with a corresponding pair of downwardly extending threaded shafts 68 and 69. The shaft 68 extends from a stepping-drive ratchet-solenoid 71 which is mounted for sliding vertical movement with respect to the plate 28 as by a dove-tail extension fitting into a vertically extending bracket 72 affixed to the plate 28. The shaft 69 extends from a housing 73 containing a reduction gear and clutch (not shown) for slow timed rotation of the shaft 69. The housing 73 is also dove-tailed for vertical sliding motion in a bracket 74 affixed to the plate 28.

Both the solenoid 71 and the housing 73 are affixed as by means of fastners 76 to a plate 77 which extends over the brackets 72 and 74 and through which are threaded two micrometer adjusting screws 78 and 79 bearing in the brackets 72 and 74, so that by means of these screws 78 and 79 the solenoid 71 and housing 73 together with their shafts 68 and 69 may be raised or lowered for initial or corrective adjustments. The solenoid 63 is spring-loaded in the inactivated position to rotate the cross-arm 61 into threaded engagement with the shaft 69 and by means of the micrometer screws 78 and 79 the transducer 45 may be raised or lowered to bring any one recording or reading head of the transducer into precise alignment with the nearest magnetic track of the tape.

The solenoid 63 is arranged so that in the activated position the cross-arm 61 is rotated to engage the threaded shaft 68 and to disengage from the shaft 69, so that the transducer may be rapidly traversed across the tape to bring any discrete recording or reading head thereof any desired position on the width of the tape. Control circuits for the solenoid 71 and 63 are not shown, but it will be readily understood that these solenoids may be operated either automatically or at the discretion of the operator.

When the cross-arm 61 is engaged with the shaft 69, the shaft is driven through the above-mentioned gear train and clutch as by means of a shaft and pulley 81 extending upwardly from the housing 73 and connected as by a belt 82 to a pulley 83 formed on the upper end of the central driving shaft 13. The reduction gear train is arranged to produce, for example, one revolution of the shaft 69 for each cycle of the tape past the transducer 45, which is feasible since the shaft 69, capstan 25 and support assembly 27 are all driven in rotation by the same motor 17. Thus, for each complete cycle of the tape, one complete helical turn is recorded on or read from the tape; and it is therefore possible to record a continuous track of information that is many times the actual length of the loop of tape.

When it is desired to record on or read from a closed magnetic track parallel to the tape edge or a group of such tracks in parallel, the clutch (above-described) within the housing 73 may be disengaged by means of controls (not shown), so that the action of the shaft 69 in driving the transducer 45 transversely of the tape is arrested.

It will be understood that, throughout the above-described operation of the machine, support assembly 27 and the elements mounted thereon rotate in the direction of arrow 91, or clockwise, as shown in FIGURE 1; idlers 43 and 57 rotate relative to the support assembly 27 in the direction of arrows 92 and 93 respectively; and capstan 25 rotates relative to the support assembly 27 in the direction of arrow 94.

It is noted that with the apparatus of the present invention it is possible to attain longitudinal tape speeds past the transducer that are suitable for recording and playing television signals longitudinally on the tape. For such use the video portion of the signal may be recorded on one track, and the audio portion, modulating a suitable carrier, may be recorded on a parallel track. Or the entire signal may be recorded on the same track with the audio signal modulating a sub-carrier of the video signal.

Figure 4:
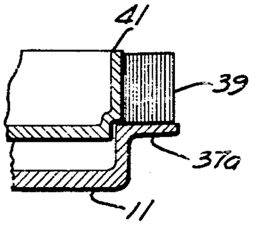
FIGURE 4 is a detailed fragmentary view of an alternate tape pack platform, in accordance with this invention.

An alternate configuration of the shoulder 37 is shown in FIGURE 4 wherein the shoulder 37*a* is slightly cone-shaped in a tilted downward and inward manner. The conical shape of the shoulder 37*a* reduces scrubbing type action between the edges of the tape and the shoulder 37 as the tape collapses to an inward position.

Figure 7:
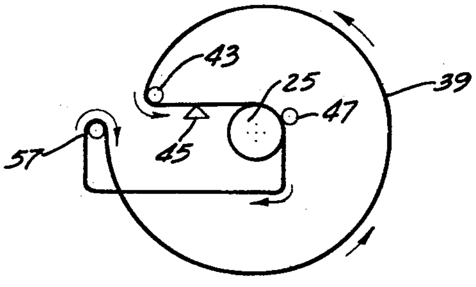
FIGURE 7 is a schematic view illustrating tape configuration in the apparatus of FIGURE 1.

In FIGURE 7, the configuration of the tape for a single loop about the tape pack 39 is shown schematically. It is noted that the tape forms a single loop having a single entry to the center wherein the transducer 45 is located.

Figure 5:
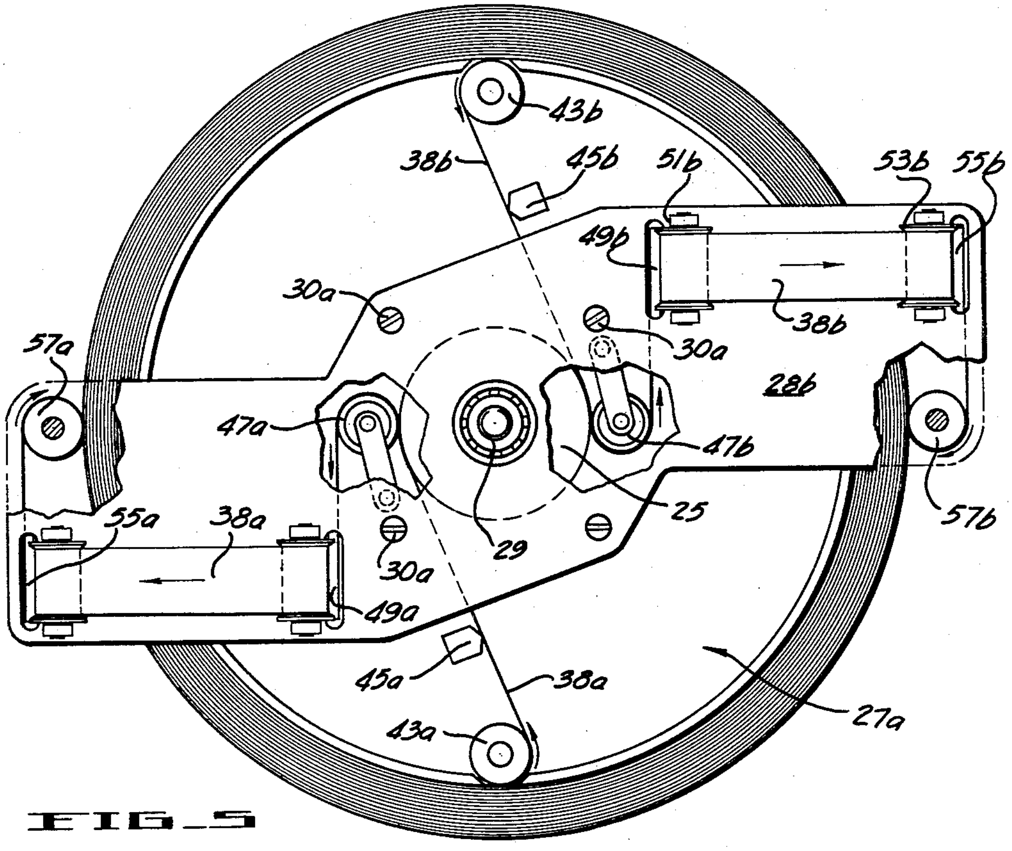
FIGURE 5 is a plan view of another embodiment of this invention.
Figure 9:
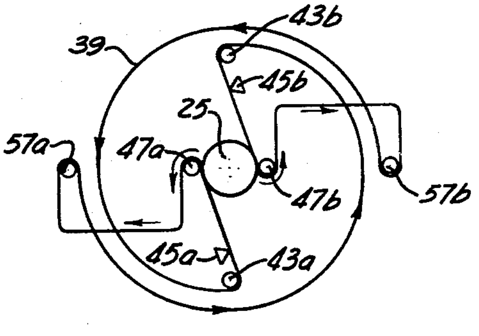
FIGURE 9 is a schematic view illustrating tape configuration in the apparatus of FIGURE 5.
Figure 8:
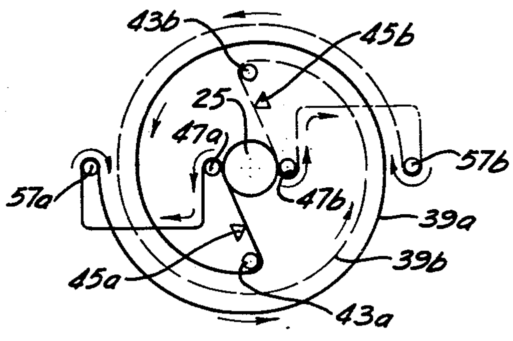
FIGURE 8 is a schematic view illustrating tape configuration in the apparatus of FIGURE 5.

An alternate embodiment of the invention is shown in plan view at FIGURE 5 and schematically in FIGURES 8 and 9. In FIGURE 5, the support assembly 27*a* is shown as having an upper plate 28*a* of symmetrical design supported on studs 30*a*, and duplicate symmetrically disposed sets of tape guide path components 45*a*, 45*b*, 43*a*, 43*b*, 47*a*, 47*b*, 49*a*, 49*b*, 51*a*, 51*b*, 53*b*, 55*a*, 55*b*, 57*a* and 57*b*. With this embodiment two entries of the tape are made toward the capstan and transducers. The two entries may be made with two tapes as shown schematically in FIGURE 8 or with a single tape as shown schematically in FIGURE 9. It should be noted, however that with two loops of tape as shown in FIGURE 8 the lengths of the tape should be substantially equal minor differences being absorbed by the air films. It will be seen that in the arrangement of FIGURE 9 considering the tape as a circular loop of one turn the transducers are necessarily spaced approximately diametrically opposite to one another so that the two lengths of tape between the transducers are equal. This condition would exist with the tape coiled in any number of turns resting on the shoulder 37; whereas in the arrangement of FIGURES 6 and 10 the transducers may be spaced as desired with respect to the length of tape, the spacing being in part a function of the proportions of tape length coiled on the respective hubs 41*a* and 41*b*. The number of record-readout points can be further multiplied by combinations of the configuration shown in FIGURES 8 and 9 or by the addition of other transducing heads and associated components.

Figure 6:
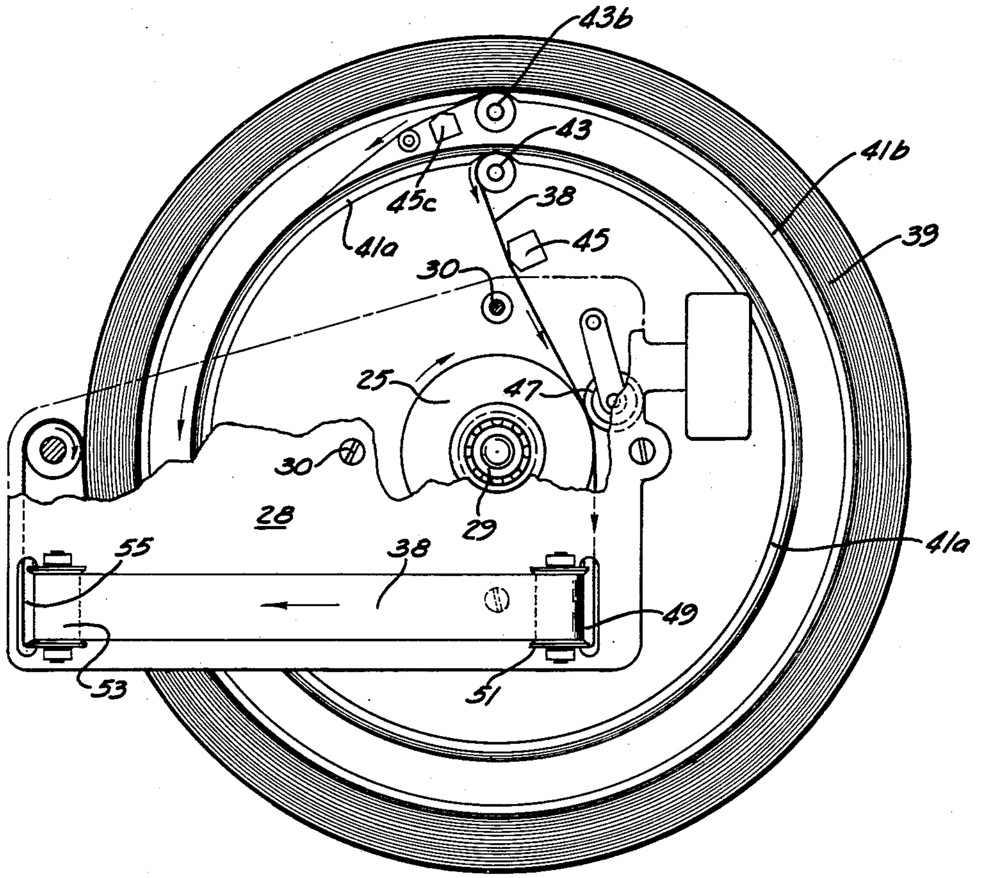
FIGURE 6 is a plan view of still another embodiment of this invention.
Figure 10:
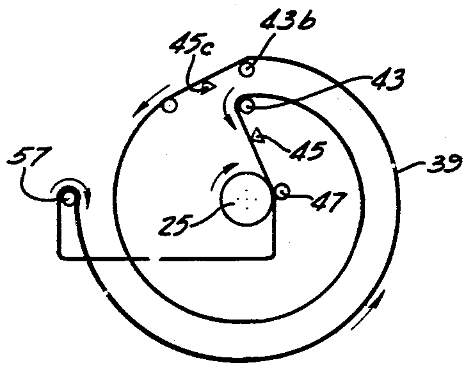
FIGURE 10 is a schematic view illustrating tape configuration in the apparatus of FIGURE 6.

FIGURES 6 and 10 show another embodiment of the invention having some elements similar to those of FIGURE 1, and in which in addition to a hub 41*a*, similar to hub 41 of FIGURE 1, a concentric spaced hub 41*b* is included for rotation therewith. An additional transducing head 45*c* is disposed between the two hubs 41*a* and 41*b* to provide additional record reproduce points in the device. In the embodiment of FIGURE 6 tape is pulled from the hub 41*b* by the hub 41*a* and an idler 43*b*. Tape is pulled from the hub 41*a* by an idler 43*a* and the capstan 25. Additional hubs may also be utilized to provide additional transducers.

The embodiments of FIGURES 5, 6, 8, 9 and 10 have not been shown with the traversing apparatus for the transducers 45, 45*a* and 45*b*, as it was illustrated for the embodiment of FIGURES 1–3; but it will be readily understood that such traversing apparatus may be provided when desired.

Thus there has been described an apparatus for storing an endless loop of tape in a substantially stationary coil, and for drawing off the interior portions of the coil, accelerating these portions to very high speed for recording or reproducing information thereon, and decelerating the moving portions while returning them to the exterior layer of the coils.

What is claimed is:

1. Tape handling apparatus comprising: base means, means mounted on said base means for retaining at least one endless tape in an annular pack, a support assembly mounted for rotation with respect to said base means, means affixed to said assembly for providing at least one loop of tape extending from the inner layer of the pack to the outer layer, and a capstan engaging the tape at said loop.

2. A tape handling apparatus as defined in claim 1 together with a transducer affixed to said support assembly and adjacent to the path of said tape at said loop.

3. A tape handling apparatus as defined in claim 1 wherein the peripheral velocity of said capstan with respect to said support assembly is intermediate the linear velocities of said support assembly with respect to said tape retaining means at the inner and outer peripheries of said pack.

4. A tape handling apparatus as defined in claim 1 wherein said means to retain the loop of tape in an annular pack includes a stationary shoulder having a concave truncated conical shape whereby the inner layers of said tape are lower than the outer layers.

5. A tape handling apparatus comprising base means, means mounted on said base means for retaining at least one endless tape in an annular pack, a support assembly mounted for rotation with respect to said base means, a plurality of means affixed to said assembly for withdrawing tape from the inside of said pack, a corresponding plurality of means for applying tape to the outside of said pack, and at least one capstan disposed between each of said means for withdrawing the tape and its corresponding means for applying the tape.

6. A tape handling apparatus as defined in claim 5 wherein a transducer is disposed between each of said means for withdrawing tape and its corresponding means for applying the tape.

7. An apparatus for handling an endless magnetic tape, comprising: an annular frame for holding said tape in a coil; a support assembly mounted for concentric rotation within said frame; a capstan mounted for concentric rotation with respect to said support means for pulling said tape from the inner turn of said coil; guide means mounted on said support assembly for conducting said tape in a path from a preselected point on the periphery of said support assembly to said capstan and from said capstan to the outer turn of said coil; a transducer mounted on said support assembly adjacent said tape path; and motor means for rotating said capstan and said support assembly at different speeds.

8. A tape handling apparatus as described in claim 7, wherein said guide means includes an annular flange extending from the periphery of said support assembly, said flange having an opening at said preselected point; and a bridge element extending from said support means and generally radially outward across said coil, said bridge element having a pair of transverse and diagonal guide post assemblies mounted at the ends thereof for conducting tape proceeding from said capstan into a planar path parallel to said support assembly and over said coil and thence into a planar path tangent with said coil at the periphery thereof.

9. An apparatus for handling an endless magnetic tape, comprising: an annular frame for holding said tape in a plurality of interleaved concentric coils; a support assembly mounted for concentric rotation within said frame; a capstan mounted for concentric rotation with respect to said support means for pulling said tape from the inner turns of said coils; a plurality of guide means for conducting the tape in each of said coils in paths from the periphery of said support assembly to said capstan and from said caprtan to the outer turns of said coils, each of said guide means including an arcuate flange extending from the periphery of said support assembly, each flange having an opening for passage of said tape radially inwardly toward said capstan, and a bridge element extending from said support means and generally radially outward across said coils, each bridge element having a pair of transverse and diagonal guide post assemblies mounted at the ends thereof for conducting tape from said capstan into a planar path parallel to said support assembly and over said coils and thense into a planar path tangent with said respective coil at the periphery thereof; a plurality of transducers mounted on said support assembly adjacent to said respective tape paths; and motor means for rotating said capstan and said support assembly at different speeds.

10. In combination with an endless magnetic tape, a tape handling apparatus comprising: an annular frame, said tape being mounted on said frame in a plurality of interleaved concentric coils; a support assembly mounted for concentric rotation within said frame; a capstan mounted for concentric rotation with respect to said support means for pulling said tape from the inner turns of said coils; a plurality of guide means for conducting the tape in each of said coils in paths from the periphery of said support assembly to said capstan and from said capstan to the outer turns of said coils, each of said guide means including an arcuate flange extending from the periphery of said support assembly, each flange having an opening for passage of said tape radially inwardly toward said capstan, and a bridge element extending from said support means and generally radially outward across said coils, each bridge element having a pair of transverse and diagonal guide post assemblies mounted at the ends thereof for conducting tape from said capstan into a planar path parallel to said support assembly and over said coils and thence into a planar path tangent with the respective coil at the periphery thereof; a plurality of transducers mounted on said support assembly adjacent to said respective tape paths; and motor means for rotating said capstan and said support assembly at different speeds.

11. In combination with a plurality of endless magnetic tapes, a tape handling apparatus comprising: an annular frame, said tapes being mounted on said frame in a plurality of interleaved concentric coils; a support assembly mounted for concentric rotation within said frame; a capstan mounted for concentric rotation with respect to said support means for pulling said tape from the inner turns of said coils; a plurality of guide means for conducting the tape in each of said coils in paths from the periphery of said support assembly to said capstan and from said capstan to the outer turns of said coils, each of said guide means including an arcuate flange extending from the periphery of said support assembly, each flange having an opening for passage of said tape radially inwardly toward said capstan, and a bridge element extending from said support means and generally radially outward across said coils, each bridge element having a pair of transverse and diagonal guide post assemblies mounted at the ends thereof for conducting tape from said capstan into a planar path parallel to said support assembly and over said coils and thence into a planar path tangent with the respective coil at the periphery thereof; a plurality of transducers mounted on said support assembly adjacent to said respective tape paths; and motor means for rotating said capstan and said support assembly at different speeds.

12. An apparatus for handling an endless magnetic tape, comprising: a first annular frame for holding a portion of said tape in an outer coil; a second annular frame concentrically mounted within said first frame for holding another portion of said tape in an inner coil; a first transducer mounted between said frames; means for guiding said tape from said outer coil and past said first transducer to said inner coil; a support means mounted for concentric rotation within said second frame; a capstan mounted for concentric rotation with respect to said support means for pulling said tape from the inner turn of said inner coil; guide means mounted on said support assembly for conducting said tape on a path from a preselected point on the periphery of said support assembly to said capstan and from said capstan to the outer turn of said outer coil; a second transducer mounted on said support assembly and adjacent said path between said preselected point and said outer turn of said outer coil; and motor means for rotating said capstan and said support assembly at independent speeds.

13. Tape handling apparatus comprising: means for retaining an endless tape in an annular pack; a support assembly mounted for rotation with respect to said pack; means affixed to said assembly for withdrawing tape from the inside of said pack and for applying tape to the outside of said pack; a capstan disposed between said last-mentioned means for moving said tape; a transducer mounted on said support assembly and adjacent to the path of said tape withdrawn from the pack; and means mounted on said support assembly for moving said transducer across the width of said tape as said transducer cycles the loop of said tape, whereby said transducer is caused to follow a helical path on the surface of said tape.

14. Tape handling apparatus as described in claim 13, wherein said transducer is mounted on a mounting element, said mounting element being mounted on said support assembly for sliding movement of said transducer across the width of said tape, and wherein said means for moving said transducer includes a worm screw mounted on said support assembly and engaging said mounting element, and means operatively connecting said worm screw and said capstan so that said screw is turned and said transducer is traversed as a function of tape movement past said transducer.

References Cited in the file of this patent

UNITED STATES PATENTS

| | | |
|---|---|---|
| 2,490,771 | Begun | Dec. 13, 1949 |
| 2,908,769 | Fonda | Oct. 13, 1959 |